July 17, 1934.   G. F. FORSYTHE   1,966,948
VIBRATION DAMPENING MOTION TRANSMITTING ELEMENT
Filed May 17, 1933   2 Sheets-Sheet 1

INVENTOR:
George F. Forsythe,
BY Bodell & Thompson
ATTORNEYS.

July 17, 1934. G. F. FORSYTHE 1,966,948
VIBRATION DAMPENING MOTION TRANSMITTING ELEMENT
Filed May 17, 1933 2 Sheets-Sheet 2
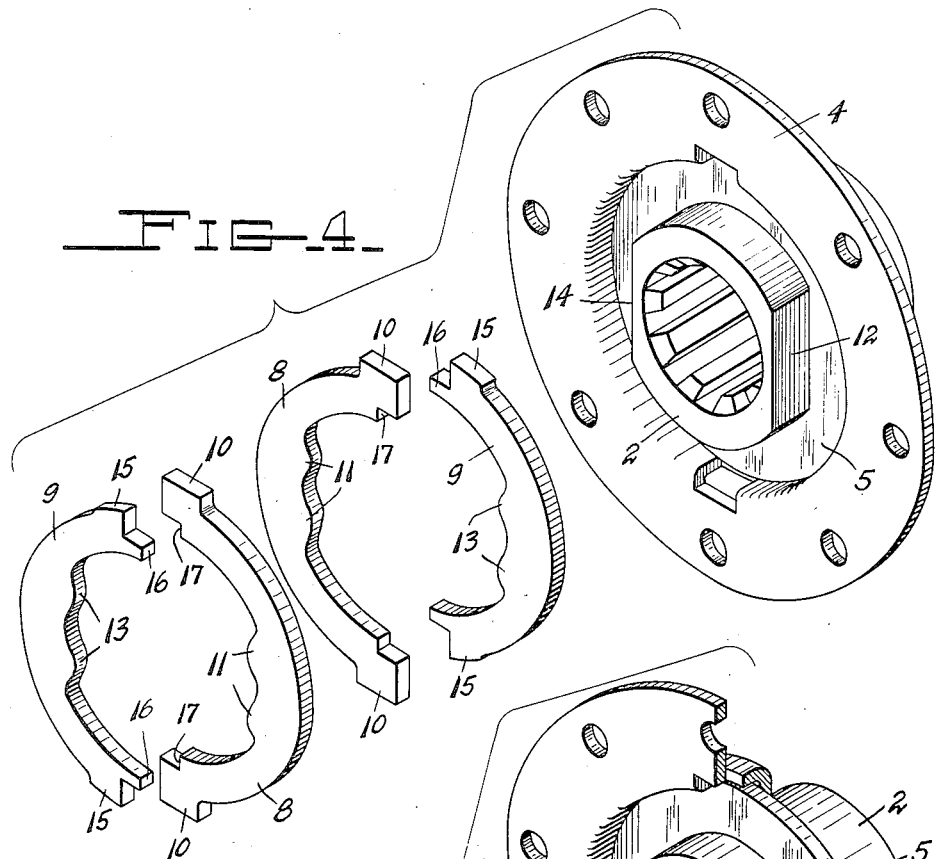
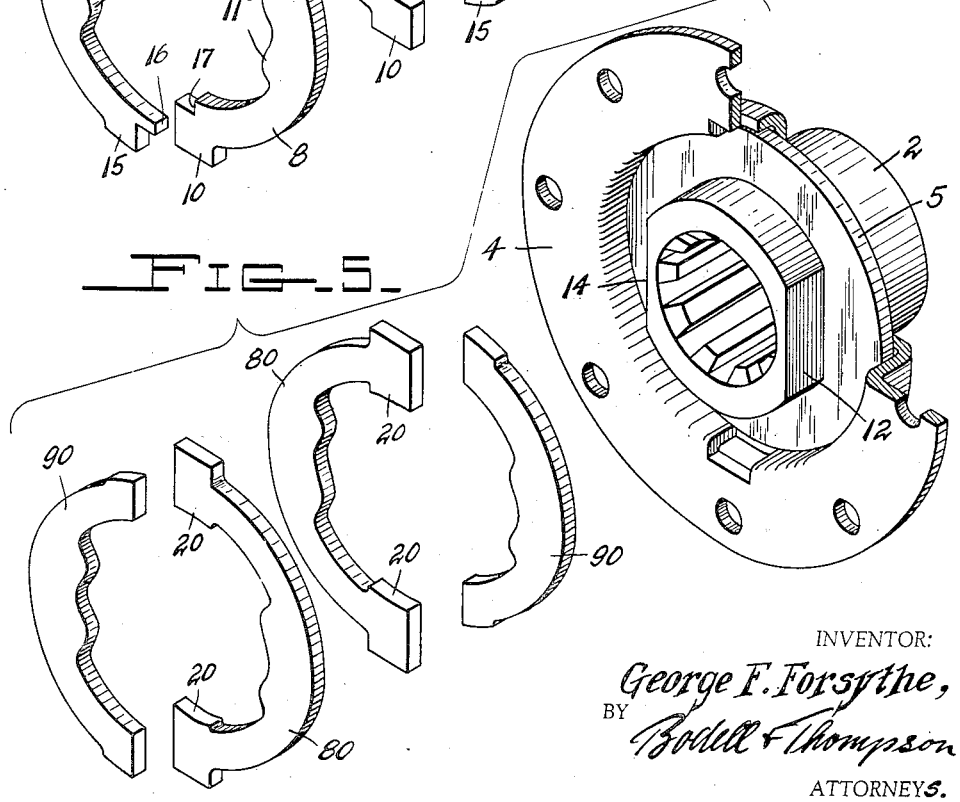
INVENTOR:
George F. Forsythe,
BY
Bodell & Thompson
ATTORNEYS.

Patented July 17, 1934

1,966,948

UNITED STATES PATENT OFFICE 1,966,948

VIBRATION DAMPENING MOTION TRANSMITTING ELEMENT

George F. Forsythe, Owego, N. Y.

Application May 17, 1933, Serial No. 671,553

10 Claims. (Cl. 64—100)

This invention relates to vibration dampeners, or torque vibration dampeners, for motion transmitting elements, and particularly for the driven member of the main clutch of automobiles, and has for its object a vibration dampener member which is particularly simple and economical in construction, readily assembled with or applied to the clutch member, or assembled with the disk and hub of the clutch member.

It further has for its object, a vibration dampener member, or members, which can be made from sheet metal stampings.

It further has for its object, a vibration dampener in which the motion is transmitted from the disk, or driving member, of the element to the hub, or vice-versa, through a vibration dampener member which is, in effect, a resilient lever or levers slidably fulcrumed on the hub and anchored on opposite sides of its fulcrum point to the disk, so that during torque vibrations, the lever, owing to its resiliency, fulcrums and distorts, and in so doing, stiffens and applies a retarding force to one or the other of the disk or hub parts, or both, to dampen the vibration.

It further has for its object, a vibration dampener member which is composed of oppositely disposed sections which are substantially semi-circular and surround the hub, each section being fulcrumed on the hub between its ends, and one section being anchored at its ends to the disk, and the other section provided with shoes for coacting with the driving member or disk of the element, or with the hub to dampen the vibration.

The invention consists in the novel features and in the combinations and constructions hereinafter set forth and claimed.

In describing this invention, reference is had to the accompanying drawings in which like characters designate corresponding parts in all the views.

Figures 4 and 5 are exploded isometric views of the parts shown in Figures 2 and 3 respectively.

Figure 1:
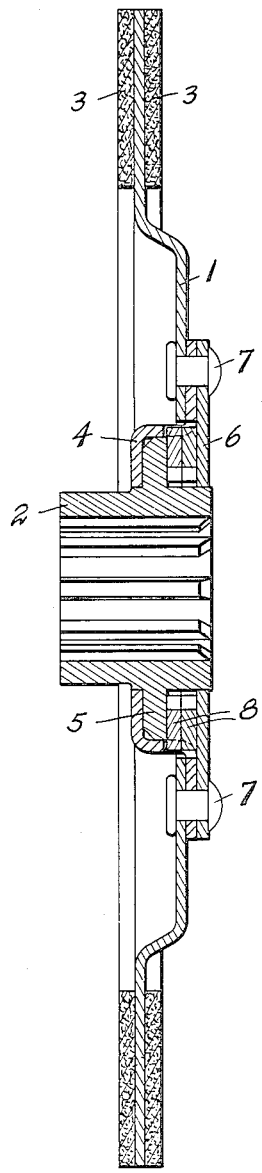
Figure 1 is a longitudinal sectional view through a clutch member embodying my invention.

I have here shown my invention as applied to the driven section or plate, or disk, of clutches such as are used in motor vehicles.

1 designates the disk, or plate, of the clutch section, and 2 the hub, these constituting the inner and outer parts of a motion transmitting element. The disk is provided with the usual friction faces 3 on opposite sides of its margin, and is also provided with a central ring 4 enclosing an annular recess opposed to the periphery of the hub 2. The hub 2 is splined, or otherwise mounted, on the clutch shaft (not shown) as will be understood by those skilled in the art, and is also formed with the usual annular flange 5, and one wall of the ring 4 laps said flange. The outer side of the recess is closed by a cover plate 6 secured to the disk 1, in any suitable manner, as by rivets 7.

Figure 2:
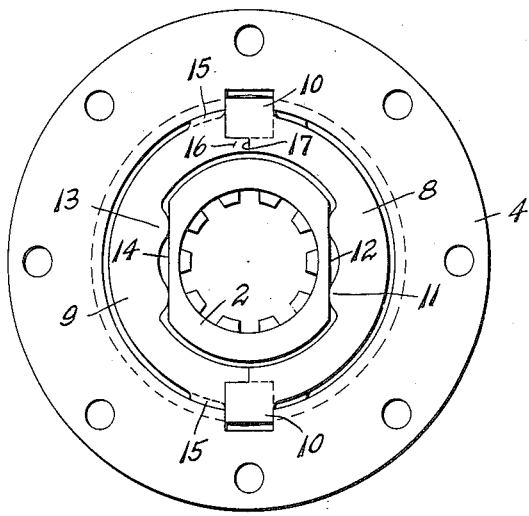
Figure 2 is a face view, parts being removed, of parts seen in Figure 1.

As shown in Figures 1, 2, and 4, the vibration dampener member includes two sections 8 and 9, each section being arcuate in general form, and one section, as 8, being anchored as at 10 at its ends to the outer part, that is, to the wall of the recess 4, and being provided with one or more fulcrums 11 between its ends which slidably engage a flattened or cam portion 12 on the periphery of the hub. Although there may be but one fulcrum 11, there are preferably two fulcrums spaced apart. The other section 9 is also formed with fulcrums 13 slidably coacting with a flattened or cam portion 14 located diametrically opposite the flattened portion 12, and the section 9 is provided with bearing faces 15 preferably at its opposite ends, here shown as coacting with the inner circumferential wall of the recess 4. Preferably, the section 9 is interlocked at its ends with the section 8 so as to be practically a unit therewith, it being here shown as provided with projections 16 which extend into notches 17 in the section 8.

In operation, assuming that the disk 1 rotates over to the left normally, the motion is transmitted to the hub by reason of the fulcrums of the sections 8, 9, which are virtually levers thrusting on the flattened, or cam portions of the hub. When an impulse occurs in the disk 1, the section 8 fulcrums on the upper fulcrum 11, and the section 9 fulcrums on the lower fulcrum 13, and the levers being resilient distort during this action applying the bearing faces 15 to stiffen the member 9 and increase dampening effect. About the same operation occurs when the hub is retarded and hence, sets up a momentary impulse in the opposite direction, that is to the right. When the hub sets up an impulse by reason of its tending to rotate faster than the disk, the lever 8 moves about its lower fulcrum 11, and the member 9 about its upper fulcrum 13, producing the retarding effect. Preferably, there are two each of the sections 8, 9, and these are alternately, or reversely arranged, and one set is reversely arranged relatively to the other. That is, the section 9 of the other set would be located behind the section 8, and the section 8 of the other set located behind the section 9.

Figure 3:
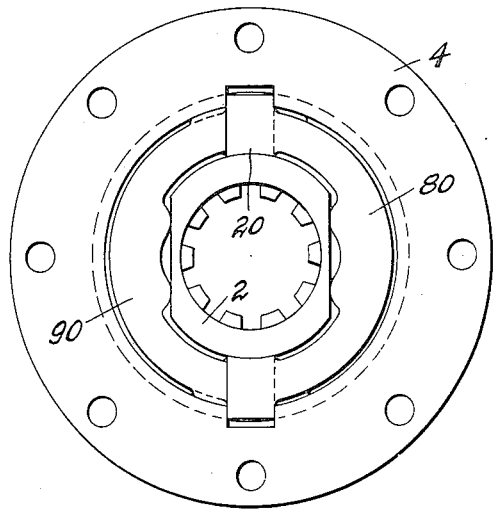
Figure 3 is a view similar to Figure 2 of a modified form of my invention.

In the form shown in Figures 3 and 5, the vibration dampening member consists of two sections 80, 90, the section 80 being anchored to the outer part, or disk, and having bearing shoes 20 coacting with the periphery of the hub instead of the outer member or disk as in Figure 2.

This vibration dampener member, or mechanism, is particularly advantageous in that it can be economically formed of stampings and readily applied between the disk and hub of the clutch member without materially modifying the structure thereof, except by forming the hub with peripheral cams, or flattened portions.

What I claim is:

1. In a motion transmitting element, the combination with inner and outer concentrically arranged parts; of vibration dampening means between said parts comprising an arcuate resilient lever extending around the inner part and anchored at its opposite ends to one of said parts, and slidably fulcrumed between its ends on the other of said parts.

2. In a motion transmitting element, the combination with outer and inner concentrically arranged parts, the outer part being provided with an annular recess around the inner part, and the inner part being a hub provided with a portion of its periphery flattened, an arcuate resilient vibration dampening lever located in the recess and fulcrumed between its ends on said flattened portion and secured at its opposite ends to the outer part.

3. In a motion transmitting element, the combination of outer and inner concentrically arranged parts, the outer part being provided with an annular recess around the inner part, and the inner part being a hub provided with a portion of its periphery flattened, a resilient vibration dampening member located in the recess and fulcrumed between its ends on said flattened portion and secured at its opposite ends to the outer part, said member having bearing faces coacting with one of said parts during relative rotative movement of the parts causing said member to have relative movement on its fulcrum point.

4. In a motion transmitting element, the combination of outer and inner concentrically arranged parts, the outer part being provided with an annular recess around the inner part, and the inner part being a hub provided with a portion of its periphery flattened, a resilient vibration dampener member located in the recess and slidably fulcrumed between its ends on said flattened portion and secured at its opposite ends to the outer part, said member having bearing faces located on opposite sides of its fulcrum and coacting with one of said parts during movement of said member on its fulcrum.

5. In a motion transmitting element, the combination of outer and inner concentrically arranged parts, the outer part being provided with an annular recess around the inner part, and the inner part being a hub provided with a portion of its periphery flattened, a vibration dampener member located in the recess and fulcrumed between its ends on said flattened portion and secured at its opposite ends to the outer part, said member having bearing faces on opposite sides of its fulcrum and coacting with the inner part.

6. In a motion transmitting element, the combination with outer and inner concentrically arranged parts, the outer part being provided with an annular recess around the inner part, and the inner part being a hub provided with a portion of its periphery flattened, a vibration dampening lever, said lever being arcuate and located in the recess and having spaced apart fulcrums between its ends coacting with the flattened portion of the hub and being anchored at its outer ends to the outer part on opposite sides of the fulcrum points.

7. In a motion transmitting element, the combination of outer and inner concentrically arranged parts, the outer part being provided with an annular recess around the inner part, and the inner part being a hub provided with a portion of its periphery flattened, a vibration dampening member located in the recess having spaced apart fulcrums between its ends coacting with the flattened portion of the hub and being anchored at its outer ends to the outer part on opposite sides of the fulcrum points, and having bearing faces for coacting with one of said parts on opposite sides of the fulcrum points.

8. In a motion transmitting element, the combination of outer and inner concentrically arranged parts, the outer part being provided with an annular recess around the inner part, and the inner part being a hub provided with diametrically opposite portions of its periphery flattened, a vibration dampener member including two oppositely disposed arcuate sections surrounding the hub and having fulcrums coacting respectively with said flattened portions of the hub, said sections being interlocked and one being anchored at diametrically opposite points spaced from the fulcrum points to the outer part, and one of said sections having bearing faces coacting with one of said parts.

9. In a motion transmitting element, the combination of outer and inner concentrically arranged parts, the outer part being provided with an annular recess around the inner part, and the inner part being a hub provided with opposite portions of its periphery flattened, a resilient vibration dampener member including two arcuate sections, said sections surrounding the hub and having fulcrums coacting respectively with said flattened portions of the hub, said members being interlocked and one being anchored at diametrically opposite points spaced from the fulcrum points to the outer part, the other of said sections having bearing faces on opposite sides of its fulcrum coacting with the outer part.

10. In a motion transmitting element, the combination of outer and inner concentrically arranged parts, the outer part being provided with an annular recess around the inner part, and the inner part being a hub provided with opposite portions of its periphery flattened, a resilient vibration dampener member annular in form and located in said recess and surrounding the hub, said member being anchored at spaced apart points to the outer part and provided with spaced apart fulcrums midway between the anchor points and slidably engaging said flattened portion, said member having bearing faces on opposite sides of the fulcrum points and coacting with one of the said parts.

GEORGE F. FORSYTHE.